(12) United States Patent
Benton et al.

(10) Patent No.: US 11,518,152 B2
(45) Date of Patent: Dec. 6, 2022

(54) BREATHABLE CLEANROOM BARRIER FABRIC

(71) Applicant: AHLSTROM-MUNKSJÖ OYJ, Helsinki (FI)

(72) Inventors: Douglas Benton, Northampton, MA (US); Vamsi Krishna Jasti, Vernon, CT (US)

(73) Assignee: AHLSTROM-MUNKSJÖ OYJ, Helsinki (FI)

( * ) Notice: Subject to any disclaimer, the term of this patent is extended or adjusted under 35 U.S.C. 154(b) by 403 days.

(21) Appl. No.: 16/480,007

(22) PCT Filed: Jan. 23, 2018

(86) PCT No.: PCT/EP2018/051528
§ 371 (c)(1),
(2) Date: Jul. 23, 2019

(87) PCT Pub. No.: WO2018/134428
PCT Pub. Date: Jul. 26, 2018

(65) Prior Publication Data
US 2019/0366697 A1     Dec. 5, 2019

Related U.S. Application Data

(60) Provisional application No. 62/449,446, filed on Jan. 23, 2017.

(51) Int. Cl.
*B32B 27/12* (2006.01)
*B32B 5/02* (2006.01)
(Continued)

(52) U.S. Cl.
CPC .............. *B32B 27/12* (2013.01); *B32B 5/022* (2013.01); *B32B 7/12* (2013.01); *B32B 27/285* (2013.01);
(Continued)

(58) Field of Classification Search
CPC ..... B32B 27/02; B32B 27/12; B32B 2250/03; B32B 2437/00; B32B 2307/724;
(Continued)

(56) References Cited

U.S. PATENT DOCUMENTS

| 5,560,974 A | 10/1996 | Langley |
| 5,766,737 A | 6/1998 | Willey |

(Continued)

FOREIGN PATENT DOCUMENTS

| CA | 1255577 | 6/1989 |
| CA | 2906904 A1 | 4/2016 |

(Continued)

OTHER PUBLICATIONS

Johnson, Larry et al., "Breathable TPE Films for Medical Applications", Published on MDDI Medical Device and Diagnostic Industry News Products and Suppliers (http://www.mddionline.com), Jul. 1, 2000.

(Continued)

*Primary Examiner* — Matthew D Matzek
(74) *Attorney, Agent, or Firm* — Cantor Colburn LLP

(57) ABSTRACT

A breathable barrier fabric that is heat sealable and minimizes lint generation without impacting the fabric's overall breathability, comfort and barrier protection, and that can be used to manufacture Helmke Category II or better cleanroom garments suitable for use in ISO Class 3 cleanroom environments and other hygienic applications. The breathable barrier fabric has a composite laminate structure including an inner monolithic film layer made from a breathable polymer bonded to first and second outer spunbond layers comprising thermoplastic bicomponent fibers each having an outer glazed surface where the thermoplastic bicomponent fibers are at least partially flattened.

18 Claims, 1 Drawing Sheet

(51) Int. Cl.
 *B32B 7/12* (2006.01)
 *B32B 27/28* (2006.01)
 *B32B 27/36* (2006.01)
 *B32B 27/40* (2006.01)
 *B32B 37/12* (2006.01)

(52) U.S. Cl.
 CPC .............. *B32B 27/36* (2013.01); *B32B 27/40* (2013.01); *B32B 37/12* (2013.01); *B32B 2250/03* (2013.01); *B32B 2250/40* (2013.01); *B32B 2262/0253* (2013.01); *B32B 2262/0284* (2013.01); *B32B 2262/12* (2013.01); *B32B 2307/718* (2013.01); *B32B 2307/724* (2013.01); *B32B 2437/00* (2013.01); *B32B 2571/00* (2013.01)

(58) Field of Classification Search
 CPC    B32B 2307/7265; A41D 13/00; A41D 13/12; A41D 13/1209; A41D 13/1236–13/1272; A41D 2500/30
 USPC ...... 442/394–398, 401, 382; 2/455, 456, 46, 2/69
 See application file for complete search history.

(56) References Cited

U.S. PATENT DOCUMENTS

| | | | |
|---|---|---|---|
| 5,899,785 | A | 5/1999 | Groten |
| 5,970,583 | A | 10/1999 | Groten |
| 6,037,281 | A | 7/2000 | Mathis et al. |
| H1978 | H | 8/2001 | Freiburger et al. |
| 6,309,736 | B1 | 10/2001 | McCormack |
| 7,501,363 | B2 | 3/2009 | Dharmadhikary |
| 9,290,877 | B2 * | 3/2016 | Shah ....................... D06C 15/00 |
| 2002/0106959 | A1 | 8/2002 | Huffines |
| 2004/0116022 | A1 | 6/2004 | Langley |
| 2004/0121678 | A1 | 6/2004 | Baldwin, Jr. et al. |
| 2006/0143767 | A1 | 7/2006 | Yang et al. |
| 2006/0160453 | A1 | 7/2006 | Sun |
| 2008/0108268 | A1 | 5/2008 | Little |
| 2011/0039083 | A1 | 2/2011 | Chen |
| 2011/0039468 | A1 | 2/2011 | Baldwin, Jr. et al. |
| 2015/0159308 | A1 | 6/2015 | Shah et al. |
| 2016/0176168 | A1 * | 6/2016 | Zhao ....................... B32B 27/32 428/143 |

FOREIGN PATENT DOCUMENTS

| | | |
|---|---|---|
| CN | 1221052 A | 6/1996 |
| CN | 105579634 A | 5/2016 |
| EP | 0232087 A2 | 8/1987 |
| WO | 2011019478 A1 | 2/2011 |
| WO | 2013101703 A1 | 7/2013 |

OTHER PUBLICATIONS

Wu, P.C., et al., "Novel Microporous Films and Their Composites", Journal of Engineered Fibers and Fabrics (http://www.jeffjournal.org), vol. 2, Issue 1, 2007.

Singh, Mukesh Kumar et al., "A review on designing viral barrier fabrics with monolithic films", International Journal of Clothing Science and Technology, vol. 24, No. ⅔, pp. 181-194, 2012.

Second Notification of Office Action by the China National Intellectual Property Administration in corresponding Application No. 201880007836.0, dated Jul. 15, 2021.

Xiaodong Xiang, "Theory, Technology and Application of Smoke and Dust Filtration", pp. 43-44, Metallurgical Industry Press, Mar. 2007.

International Search Report for PCT/EP2018/051528 dated Mar. 5, 2018.

Written Opinion of the International Searching Authority for PCT/EP2018/051528 dated Mar. 5, 2018.

Examination Report by The Patent Office, Intellectual Property India in corresponding Application No. 201917029653, dated Mar. 17, 2021.

First Notification of First Office Action by the China National Intellectual Property Administration in corresponding Application No. 201880007836.0, dated Feb. 5, 2021.

Extended European Search Report by the European Patent Office in corresponding Application No. EP 21154724, dated Feb. 25, 2021.

* cited by examiner

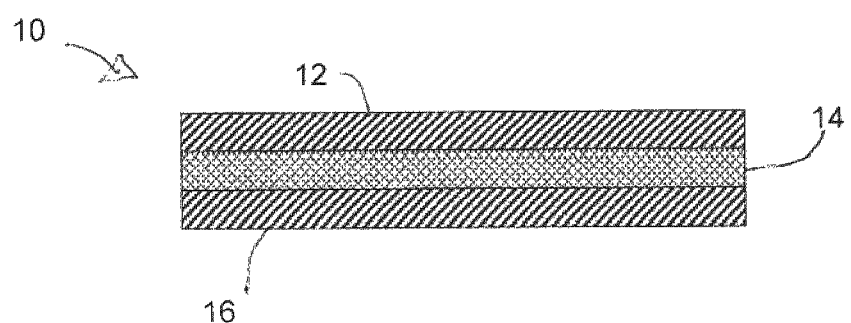

BREATHABLE CLEANROOM BARRIER FABRIC

This application is the U.S. national phase of International Application No. PCT/EP2018/051528 filed Jul. 23, 2018 which designated the U.S. and claims priority to U.S. Provisional Application No. 62/449,446 filed Jul. 23, 2017, the entire contents of each of which are hereby incorporated by reference.

TECHNICAL FIELD

This disclosure generally relates to a composite laminate structure that exhibits breathability, barrier protection and comfort, and more particularly to a breathable barrier fabric for personal protective equipment (or PPE) suitable for use in ISO 14644-1 Class 3 or lower cleanroom environments or other hygienic applications, and methods of making the same.

BACKGROUND

Cleanrooms are used in practically every industry where small particles can adversely affect the manufacturing or research process, such as semiconductor and electronics manufacturing, aerospace, pharmaceuticals, biotech, optics, medical device and life sciences. A cleanroom is any contained space where provisions are made to reduce particulate contamination, including environmental pollutants such as dust, airborne microbes, aerosol particles and chemical vapors, and control other environmental parameters such as temperature, humidity and pressure. Cleanrooms have a controlled level of contamination that is classified by the number of particles per cubic meter at a specified particle size under the ISO 14644-1 standard classification system adopted by the International Standards Organization (ISO). Each classification of the ISO 14644-1 standard is referred to herein as "ISO Class _____". For example, ambient air outside in a typical urban environment has a concentration of 35,000,000 particles per cubic meter in the size range 0.5 µm and larger in diameter, which corresponds to the lowest level of ISO 14644-1 cleanroom standards (ISO Class 9); whereas the highest level of cleanroom standards (ISO Class 1) allows a concentration of only 10 particles per cubic meter in the size range of 0.1 µm or larger. ISO Class 2 allows a concentration of up to 10 particles per cubic meter in the size range of 0.3 µm and larger and a concentration of up to 4 particles per cubic meter in the size range of 0.5 µm and larger. ISO Class 3 allows a concentration of up to 102 particles per cubic meter in the size range of 0.3 µm and larger and a concentration of up to 35 particles per cubic meter in the size range of 0.5 µm and larger.

In addition to the mechanical structures of a cleanroom, such as air flow management equipment and filters used to trap particles that are 0.3 µm and larger in size, cleanroom workers also wear special garments designed to trap contaminants that are naturally generated by skin and the body, and thereby prevent such substances from contaminating the cleanroom environment. Potential human contaminants include bacteria, viruses and the millions of skin flakes that the human body sheds daily. Such cleanroom garments or personal protective equipment (PPE) may also minimize a worker's exposure to hazards in the cleanroom such as chemical, radiological, physical, electrical, mechanical or other workplace hazards, should permit the body to breathe, and should allow cleanroom workers the flexibility to move as needed to perform all required tasks. Depending on the cleanroom ISO classification or function, cleanroom garments may include lab coats, hairnets, boots, shoes, aprons, beard covers, bouffant caps, coveralls, facemasks, frocks, gowns, gloves and finger cots, hoods, sleeves, shoe covers and multi-layered full body suits with a self-contained breathing apparatus.

To further prevent contaminating a cleanroom environment, cleanroom garments themselves should also not release particles or fibers (i.e., lint) during the course of normal wear. Lint is defined herein as the small fiber particles/fiber dust that come out of a fabric material during usage (as distinct from abrasion, which is the loss of surface or physical destruction of fibers when an external mechanical force, such as rubbing, is applied on the material's surface). Lint can be a consequence of a material's composition (i.e., short fibers that are not bonded or held together well) or mechanical energy, bending or stretching during use. The Helmke drum test method is used to quantify lint that is dislodged from garments through the application of mechanical energy under dry conditions as a means of simulating lint shedding from the surface of the garment during use. As described by the Institute of Environmental Sciences and Technology in 2011, garments under the Helmke drum test method are tumbled in a rotating drum to release lint from the fabric in a controlled manner. An automatic, discrete particle counter is used to sample the air within the drum to determine the average particle concentration of the air per minute during the initial ten minutes of the test. This particle concentration is used to compute a particle emission rate, which is then compared to a Helmke garment cleanliness classification for a particular type of garment to determine the garment's cleanliness classification. For example, for a Helmke Category I cleanroom coverall, the classification system requires a particle emission rate of less than 2,000 particles per minute for particles with a particle size of at least 0.3 µm and less than 1,200 particles per minute for particles with a particle size of at least 0.5 µm. For a Helmke Category II cleanroom coverall, the classification system requires a particle emission rate of less than 20,000 particles per minute for particles with a particle size of at least 0.3 µm and less than 12,000 particles per minute for particles with a particle size of at least 0.5 µm. For a Helmke Category III cleanroom coverall, the classification system requires a particle emission rate of less than 200,000 particles per minute for particles with a particle size of at least 0.3 µm and less than 120,000 particles per minute for particles with a particle size of at least 0.5 µm.

There are many commercially available cleanroom apparel products that meet Helmke Category II requirements and better, such as AlphaProTech's CRITICAL COVER® COMFORTECH® ASSURANCE Coveralls, DuPont's PROCLEAN® Cleanroom Apparel, 3M's Protective Coverall 4565, Kimberly-Clark's KIMTECH PURE* A5 Sterile Cleanroom Apparel, and DuPont's TYVEK® ISOCLEAN® and TYVEK® MICRO-CLEAN®. However, reusable cleanroom garments are not reliable, having a particle and bacterial filtration efficiency of about 70%, and a 25% drop in bacterial filtration efficiency after laundering and sterilization. Other cleanroom garments have a particle and bacterial filtration efficiency of between about 94% and 98%, and some have a filtration efficiency of at least 98%, but they use materials that are non-breathable, which reduces the garment's comfort and creates additional stiffness. Such garments usually include a film material that serves as an aqueous liquid impervious layer, and lacks breathability, causing the garments to be hot and uncomfortable.

Accordingly, there is a need for improved barrier fabrics for use in cleanroom and other hygienic environments that are breathable, soft to the touch, strong and provide a bacteria and viral barrier while also having particle emission rates suitable for use in ISO Class 3 or above cleanroom environments.

SUMMARY

The foregoing purposes, as well as others, are achieved by a breathable barrier fabric that is heat sealable and minimizes lint generation without impacting the fabric's overall breathability, comfort and barrier protection from blood-borne pathogens (as determined by ASTM F1671 and ISO 16604). Thus, the breathable barrier fabric can be used to manufacture Helmke Category II or better cleanroom garments suitable for use in ISO Class 3 cleanroom environments and other hygienic applications.

In one aspect of this disclosure, the breathable barrier fabric comprises a composite laminate structure having an inner monolithic film layer made from a breathable polymer surrounded by first and second outer spunbond nonwoven layers comprising thermoplastic bicomponent fibers. The first and second outer spunbond nonwoven layers each have an inner surface bonded to a surface of the film layer and an outer glazed surface where the thermoplastic bicomponent fibers are at least partially flattened. The film layer can be formed to have a water-vapor transmission rate of 500 to 2,200 grams per square meter per day, preferably 500 to 2,100 grams per square meter per day. The resulting breathable barrier fabric meets the Helmke garment cleanliness classification of Category II, which has a particle emission rate of less than 20,000 particles per minute for particles with a particle size of at least 0.3 μm and less than 12,000 particles per minute for particles with a particle size of at least 0.5 μm measured by a Helmke drum test method for a coverall or other sample having a surface area of 5.99 square meters (including both sides).

In another aspect of the disclosure, a Helmke Category II cleanroom garment suitable for use in ISO Class 3 cleanroom and other hygienic applications comprises the breathable barrier fabric described herein.

In yet another aspect of the disclosure, methods of fabricating a breathable barrier fabric are provided that include the steps of forming a first outer spunbond layer comprising thermoplastic bicomponent fibers; forming an inner monolithic film layer made from a breathable polymer; forming a second outer spunbond layer comprising thermoplastic bicomponent fibers; glazing an outer surface of each of the first outer spunbond layer and the second outer spunbond layer where the thermoplastic bicomponent fibers are at least partially flattened; and bonding an inner surface of the first outer spunbond layer and the second outer spunbond layer to a surface of the film layer to form the breathable barrier fabric having a particle emission rate of less than 20,000 particles per minute for particles with a particle size of at least 0.3 μm and less than 12,000 particles per minute for particles with a particle size of at least 0.5 μm measured by a Helmke drum test method for a coverall or other sample having a surface area of 5.99 square meters (including both sides). In certain embodiments of the method, the film layer can be formed with a breathable polymer comprising one or more copolyester thermoplastic elastomers and the film layer can be formed to have a water-vapor transmission rate of 500 to 2,200 grams per square meter per day, preferably 500 to 2,100 grams per square meter per day.

Other objects, features, and advantages of the various embodiments in the present disclosure will be explained in the following detailed description with reference to the appended drawings.

BRIEF DESCRIPTION OF DRAWINGS

FIG. 1 is an illustration of a breathable barrier fabric.

DETAILED DESCRIPTION

In the following detailed description and accompanying drawing, various embodiments of a breathable barrier fabric 10 are described to illustrate the general principles in the present disclosure. It will be recognized by one skilled in the art that the present disclosure may be practiced in other analogous applications or environments and/or with other analogous or equivalent variations of the illustrative embodiments. It should be noted that those methods, procedures, components, or functions that are commonly known to persons of ordinary skill in the field of the disclosure are not described in detail herein.

The term "nonwoven fabric", as used herein, means a web of individual fibers, filaments, or threads that are positioned and oriented in a random manner (i.e., without an identifiable pattern). Examples of nonwoven fabrics include melt-blown webs, spunbond webs, carded webs, air-laid webs, wet-laid webs and spunlaced webs and composite webs comprising two or more nonwoven layers.

The term "spunbond", as used herein, refers to a process in which filaments are formed by extruding molten thermoplastic polymer material from a plurality of fine capillaries of a spinneret, with the diameter of the extruded filaments then being rapidly reduced by drawing. Spunbond nonwoven fabrics or webs are formed by laying spunbond filaments randomly on a collecting surface such as a foraminous screen or belt. Spunbond webs can be bonded by methods known in the art such as hot-roll calendering, through air bonding (generally applicable to multiple component spunbond webs), or passing the web through a saturated-steam chamber at an elevated pressure.

The term "bicomponent fiber", as used herein, refers to any fiber or filament (i.e., continuous or discontinuous) that is composed of two distinct polymers which have been spun together to form a single filament or fiber. Preferably each bicomponent fiber is made from two distinct polymers arranged in distinct substantially constantly positioned zones across the cross section of the bicomponent fiber and extending substantially continuously along the length of the fiber. Continuous bicomponent fibers are fibers produced by extruding two polymers from the same spinneret with both polymers contained within the same filament. Depending on the arrangement and relative quantities of the two polymers, the structure of a bicomponent fiber can be classified as core and sheath, side by side, tipped, microdenier, mixed fibers, etc. A sheath-core bicomponent fiber comprises a core made of one thermoplastic material and a sheath made of a different thermoplastic material. The core can be concentric or eccentric relative to the sheath and can have the same or a different shape compared to that of the sheath. The sheath-core structure is employed when it is desirable for the surface of the fiber to have the property of the sheath such as luster, dyeability or stability, while the core may contribute to strength, reduced cost and the like. Bicomponent fibers often have a sheath made of thermoplastic material having a melting point which is lower than the melting point of the thermoplastic material of the core.

As used herein, the term "monolithic film" means a non-porous film that is "breathable" in the sense that the film acts as a barrier to aqueous liquids and particulate matter but allows water vapor and air to pass therethrough. Rather than holes produced by a physical processing of the monolithic film, the film has passages with cross-sectional sizes on a molecular scale formed by a polymerization process. The passages serve as conduits by which water (or other liquid) molecules can disseminate through the film. Vapor transmission occurs through a monolithic film as a result of a concentration gradient across the monolithic film. This process is referred to as activated diffusion. As water (or other liquid) evaporates from a body on the body side of the film, the concentration of water vapor increases. The water vapor condenses and solubilizes on the surface of the body side of the film. As a liquid, the water molecules dissolve into the film. The water molecules then diffuse through the monolithic film and re-evaporate into the air on the side having a lower water vapor concentration. In contrast to a microporous film, a monolithic film as used herein thus allows the passage of water vapor because of the hydrophilic character of the underlying polymer. Preferably, the monolithic film is prepared from an amorphous polymer. The term "amorphous polymer" in the context of the present disclosure relates to a polymer that has fewer hard (i.e. crystalline) segments than soft segments.

As used herein, the term "about" in the context of numerical values means that specific values may be modified by +/−10%. As regards endpoints of ranges, the modifier "about" preferably means that the lower endpoint may be reduced by 10% and the upper endpoint may be increased by 10%. It is also contemplated that each numerical value or range disclosed in this application can be absolute, i.e. that the modifier "about" can be deleted.

An embodiment of a breathable barrier fabric 10 in accordance with this disclosure is illustrated in FIG. 1. The breathable barrier fabric is a laminate comprising three layers—a first outer spunbond layer 12 comprising thermoplastic bicomponent fibers, an inner or middle monolithic film layer 14 made from a breathable polymer, and a second outer spunbond layer 16 comprising thermoplastic bicomponent fibers. The term "breathable polymer" in the context of the present invention relates to a polymer that allows formation of a film when cast or coated wherein the film acts as a barrier to aqueous liquids and particulate matter but allows water vapor and air to pass therethrough. The individual layers of the breathable barrier fabric may be bonded together by known means, including thermal mechanical bonding, ultrasonic bonding, adhesives, stitching and the like. In the disclosed embodiment, an inner surface of the first outer spunbond layer 12 and an inner surface of the second outer spunbond layer 16 are each bonded to the film layer 14 with an adhesive having a weight in the range of about 1 to 4 grams per square meter such as a hot melt adhesive, ultraviolet curable adhesive, thermoset adhesive, or aqueous based glues.

The monolithic film layer 14 may be made from any type of breathable polymer and by any known method for forming monolithic films of one or more layers, preferably those that do not require a filler, such as by extrusion coating or melt embossed cast film methods. For example, suitable breathable polymers include polyether block amide copolymer, polyester block amide copolymer, copolyester thermoplastic elastomer and thermoplastic urethane elastomer. In the disclosed embodiment, the breathable polymer in the film layer comprises one or more copolyester thermoplastic elastomers or resins, such as ARNITEL® EM400-01, 550 and 3104 available from DSM Engineering, and HYTREL® G3548, 8206 and 4056 available from DuPont. The monolithic film layer has a basis weight in the range of about 5 to 40 grams per square meter, preferably 10 to 30 grams per square meter and can depend on the desired water-vapor transmission rate (WVTR). The monolithic film layer 14 acts as a barrier to aqueous liquids and particulate matter but allows water vapor and air to pass therethrough, and also provides desired barrier properties for protection from viral and bacterial blood-borne pathogens as determined by ASTM F1671 and ISO 16604 test methods. This differs from microporous films, such as those disclosed in U.S. Pat. No. 6,037,281, which are porous and do not provide the desired barrier properties because of difficulties in controlling the pore size distribution in the film.

The water vapor property of the monolithic film layer 14, and the breathable barrier fabric 10 formed with the monolithic film layer 14, is characterized by a water-vapor transmission rate (WVTR) of 500 to 2,200 grams per square meter per day, preferably 500 to 2,100 grams per square meter per day, when tested according to ASTM E 96-00. Following this standard, circular samples of the breathable barrier fabric were individually placed over 80×40 mm evaporating dishes filled with 100 mL of distilled water and then taped to the sides of the dish. The evaporating dish along with the sample and the distilled water was weighed (initial weight). The dish was then placed in an controlled environment (90±2° F./32±1° C., 50±2% RH %) for 24 hours. After 24 hours, the dish, sample and remaining water was re-weighed (final weight) and the difference was calculated. For the standard 24-hour interval, the moisture loss was divided by the area of the sample tested (0.00312 square meters).

In some embodiments of the invention the film can be multilayer, each layer consisting of polymers with a different composition corresponding to a different WVTR. In a preferred embodiment of the invention, the inner monolithic film layer comprises three sub-layers. Corresponding films comprising three sub-layers can be obtained by way of co-extrusion of different breathable polymers that are discussed herein above. Such a co-extrusion process allows the preparation of A-B-A type films wherein the outer sub-layers A differ in terms of their amorphous character from the inner sub-layer B. Particularly preferred embodiments involve a three-layered A-B-A type monolithic film wherein the inner sub-layer B has a lower amount of crystalline segments than the outer sub-layers A. Preferably, the monolithic film is obtained from different polymers having a varying degree of crystallinity such that the most amorphous polymer is used for the formation of a central portion of the film. The use of polymers that differ from each other in terms of crystallinity and thus amorphous character allows the inner monolithic film layer to maintain some crystallinity in its outer regions. Without wishing to be bound by any theory, the inventors believe that providing some hard segments in the polymer that yield some crystallinity in the outer sub-layers A of the monolithic film layer help to improve adhesive forces between the first and second outer spunbond layers (12, 16) and the inner monolithic film layer.

The first outer spunbond layer 12 in the breathable barrier fabric 10 has a weight in the range of about 10 to 70 grams per square meter, and the second outer spunbond layer 16 in the breathable barrier fabric has a weight in the range of about 10 to 70 grams per square meter. The total weight of the breathable barrier fabric 10 is therefore in the range of about 27 to 188 grams per square meter. The thermoplastic bicomponent fibers in the first outer spunbond nonwoven layer and the second outer spunbond nonwoven layer comprise a polyethylene sheath and a polyethylene terephthalate core, preferably where the polyethylene sheath comprises a high-density polyethylene. The outer layers create strong bonding in the seams of any garment made from the breathable barrier fabric 10 using heat or ultrasonic fabrication methods. The outer layers also provide softness to touch, drapability and comfort, as well as a silky feel, flexibility and a low coefficient of friction so hands and other surfaces slide easily across the breathable barrier fabric 10.

The first outer spunbond layer 12 and the second outer spunond layer 16 may be produced by any known method for producing thermally bonded spunbond nonwoven fabric, such as the processes disclosed at column 5, lines 1-53 and FIG. 1 in co-owned U.S. Pat. No. 9,290,877 (the '877 patent), the entire disclosure of which is incorporated herein by reference, and then further treated to "glaze" one or both surfaces of the produced thermally bonded spunbonded nonwoven as further disclosed in the '877 patent. The glazing process forms an outer glazed surface where the thermoplastic bicomponent fibers are at least partially flattened that reduces lint generation or the particle shedding count of the breathable barrier fabric. The term "glazed" surface as used herein and similar expressions define a surface that is obtained by applying heat and pressure to said surface. Without wishing to be bound by any theory, it is believed that the glazing treatment of the outer surface of the first and second outer spunbond layers results in melting and subsequent resolidification of the outer region of the spunbond layer. Heat and pressure can be applied by the circumferential surface of a heater smooth roll on that portion of the surface of the layer that is in contact with the heater roll, such as described in column 6, lines 19-30 of U.S. Pat. No. 9,290,877 (the '877 patent). The pressure can be altered by adjusting the relative speeds of the machine and glazing rolls shown in FIG. 2 of the '877 patent. The surface temperature of the heated smooth roll can be in a range of 290 to 330° F. (143.3-165° C.), preferably 300 to 330° F. (148.9-169.5° C.), depending on the melting point of the polymer used in the spunbond layers. Preferably, the glazed surface is obtained by heating the outer surface of the outer spunbond layers to the melting temperature of the thermoplastic bicomponent fibers or to the melting temperature of those parts of the thermoplastic bicomponent fibers that come into contact with the heater smooth roll or similar glazing equipment.

The outer glazed surfaces of the first outer spunbond layer 12 and the second outer spunbond layer 16 in the disclosed breathable barrier fabric 10 exhibit an average weight loss not greater than 3.5%, preferably not greater than 3.0%, and more preferably not greater than 2.5% calculated based on weight loss measured by a Taber shaving weight loss test method. The relevant test method is defined in column 10 (from line 27) to column 12 (up to line 58) of U.S. Pat. No. 9,290,877 (the '877 patent). The Taber Shaving Weight Loss Method described in the '877 patent was used to characterize the abrasion resistance of the breathable barrier fabric 10. This test method was designed to quantitatively evaluate the abrasion resistance of spunbond nonwovens and composites (i.e., laminates). In accordance with this method, a specimen is prepared, attached to the Taber abrasion apparatus, and abraded using two wheels comprised of abrasive particles that scuff the test sample as it rotates. Each rotation is a cycle. One abrading wheel rubs the specimen outward, i.e., toward the periphery and the other rubs it inward, i.e., toward the center. The wheels traverse a complete circle (cycle) on the specimen surface for a total of 40 cycles. This allows for evaluation of abrasion resistance at all angles relative to the weave or grain of the material. The fiber that is lifted creates an appearance of a fluffy ring on the specimen at the point of contact with the abrasive wheels. (As used herein, the term "fluffiness" means the fuzzy appearance of the fiber after abrasion caused by fibers lifting off of the web.) The sample is weighed after abrasion ($Wt^1$), the loose material shaved off, and then the sample is re-weighed ($Wt^2$). The Taber Shaving Weight Loss is then calculated as a percentage of the difference between the weight of the sample after being subjected to 40 Taber abrasion cycles ($Wt^1$) and the weight of the same abraded sample after shaving ($Wt^2$), divided by weight $Wt^1$ and then multiplied by 100. The Taber Shaving Weight Loss was measured for 8 replicates taken from each breathable barrier fabric sample disclosed below and then an average Taber Shaving Weight Loss was calculated based on the 8 measured values to arrive at a single data point for each breathable barrier fabric sample.

The three layers of the breathable barrier fabric 10 are each fabricated and then combined to produce the breathable barrier fabric in accordance with any known nonwoven laminate production methods. For example, the methods disclosed in co-owned U.S. Pat. No. 7,501,363, the entire disclosure of which is incorporated herein by reference thereto, for producing a tri-laminate structure may be used to produce the breathable barrier fabric 10. Generally, the first outer spunbond layer 12 is unwound from a primary nonwoven turret unwind and the second outer spunbond layer 16 is unwound from as secondary nonwoven turret unwind. Turret winders and unwinds provide continuous operation. Adhesive applicators spray adhesive onto the unglazed inner surfaces of the first outer spunbond layer 12 and the second outer spunbond layer 16. The monolithic film layer 14 is then bonded to the adhesive-coated inner surfaces of the out spunbond layers in lamination nip rolls. The monolithic film layer 14 may be produced in-line or unwound from a pre-made roll of film. The adhesive application can be done in one or more stages. Where lamination is carried out in multiple stages, a bi-laminate is made in the first lamination step, and then the bi-laminate is converted into a tri-laminate in the second lamination step. Moreover, the adhesive can be applied either onto the inner surfaces of the outer layers as described above, or directly onto the film. The breathable barrier fabric 10 may be edge-trimmed and slit in an edge trimmer and then wound up in a roll using a turret rewind.

The breathable barrier fabric 10 as described above is suitable for use in Helmke Category II cleanroom garments, as it has a particle emission rate of less than 20,000 particles per minute for particles with a particle size of at least 0.3 μm and less than 12,000 particles per minute for particles with a particle size of at least 0.5 μm measured by a Helmke drum test method for a coverall.

Examples

The comparative examples shown in Table I illustrative the improved properties of breathable barrier fabric 10

TABLE I

|  | SAMPLE 1 | SAMPLE 2 | SAMPLE 3 | SAMPLE 4 |
| --- | --- | --- | --- | --- |
| First Outer Spunbond Layer* | 30 gsm (unglazed) | 30 gsm (glazed) | 30 gsm (glazed) | 20 gsm (glazed) |

TABLE I-continued

|  | SAMPLE 1 | SAMPLE 2 | SAMPLE 3 | SAMPLE 4 |
|---|---|---|---|---|
| Adhesive | 1 gsm | 1.5 gsm | 1.5 gsm | 1 gsm |
| Inner Monolithic Film Layer | 15 gsm CoPET | 15 gsm CoPET | 15 gsm CoPET | 10 gsm CoPET |
| Adhesive | 1 gsm | 1.5 gsm | 1.5 gsm | 1 gsm |
| Second Outer Spunbond Layer** | 22 gsm (unglazed) | 22 gsm (unglazed) | 28 gsm (glazed) | 20 gsm (glazed) |
| Total Basis Weight*** | 69 gsm | 70 gsm | 76 gsm | 52 gsm |

*The first outer spunbond layer is the outer exposed layer of the breathable barrier fabric
**The second outer spunbond layer is the inner layer of the breathable barrier fabric.
***The basis weight was measured according to standard test method ASTM 3776-96.

The four samples have the properties shown in Table II that are relevant to the breathable barrier fabric's applicability to Helmke Category II and Category III cleanroom garments for use in ISO Class 3 or higher cleanroom environments. All four samples pass the ASTM F1671 standard test method for resistance of materials used in protective clothing.

TABLE II

| PROPERTIES | SAMPLE 1 | SAMPLE 2 | SAMPLE 3 | SAMPLE 4 |
|---|---|---|---|---|
| Handle/Softness (grams) (MD/CD) | 18.2/7.6 | 16.2/7.2 | 32.9/20 | 14/8 |
| Water Vapor Transmission Rate (gsm per day) | 1404 | 1526 | 1508 | 1567 |
| Abrasion Resistance - Exposed Outer Spunbond Layer (% Weight Loss) | 1.47 | 0.81 | 0.51 | 1.89 |
| Abrasion Resistance - Inner Spunbond Layer (% Weight Loss) | 1.42 | 1.42 | 0.78 | 2.1 |
| Particle Emission Rate (Particles/minute) (≥0.3 μm) | 47,912 | 67,893 | 1,222 | 4,369 |
| Particle Emission Rate (Particles/minute) (≥0.5 μm) | 36,366 | 55,395 | 934 | 3,416 |
| Helmke Garment Cleanliness Classification | Category III | Category III | Category I | Category II |

The properties set forth in TABLE II were determined in accordance with the following test methods.

The handle, or flexibility and surface friction, of the breathable barrier fabric was characterized according to a modified TAPPI T498 cm-85. A 4"×4" test specimen of the breathable barrier fabric was deformed through a 10 mm slot by a blade shaped plunger and the required force is measured by a Handle-O-Meter. The calculated force is a measure of both flexibility and surface friction of the breathable barrier fabric. The data generated correlates well with the actual performance of the material in production processes and finished product performance. This instrument expedites the evaluation of a product by replacing the use of a sensory panel to measure softness or hand feel, which can be subjective and time consuming.

The water vapor transmission rate was tested according to ASTM E 96-00 as described above. The abrasion resistance was tested according to the Taber Shaving Weight Loss test described above and in the '877 patent.

The particle emission rate was tested according to the Helmke drum test method. Individual samples of the breathable barrier fabric 10 (8.5"×11"), having a total surface area of 0.12 square meters, were tested according to IEST-RP-CC003.4 B2.5 to quantify the particles dislodged from each sample resulting from the application of mechanical energy under dry conditions. Each sample was individually tumbled in a rotating drum to release particles in a controlled manner. The rotating drum was set to 10 revolutions/minute. The average particle concentration of the air was determined using an automatic, discrete particle counter that samples the air within the drum during the test. The readings were taken separately after every minute of testing for initial 10 minutes. The average particle count is measured per minute. The total particle count is then converted to a standard coverall garment size having a surface area of 5.99 square meters. This is done by multiplying by a conversion factor. For example, the conversion factor for a coverall is 49.64 (coverall surface area 5.99 sq·m/test specimen surface area 0.12 sq·m).

Based on the particle emission rate for the particles dislodged from the sample, the samples are rated according the Helmke garment cleanliness classification, Table B2 in IEST-RP-CC003.4. For Class II, a garment, or coverall having a surface area of 5.99 square meters, would have to meet the requirements of 2,000 to 20,000 particles/min for particles 0.3 μm or larger and 1,200 to 12,000 particles/min for particles 0.5 μm or larger. The lower Class III rating would be 20,000 to 200,000 particles/min for particles 0.3 μm or larger and 12,000 to 120,000 particles/min for particles 0.5 μm or larger.

Many other modifications and variations may of course be devised given the above description of various embodiments for implementing the principles in the present disclosure. It is intended that all such modifications and variations be considered as within the spirit and scope of this disclosure, as defined in the following claims.

We claim:
1. A breathable barrier fabric comprising:
a first outer spunbond layer comprising thermoplastic bicomponent fibers;
an inner monolithic film layer made from a breathable polymer; and
a second outer spunbond layer comprising thermoplastic bicomponent fibers;
the first outer spunbond layer and the second outer spunbond layer each having an inner surface bonded to a surface of the film layer and an outer glazed surface where the thermoplastic bicomponent fibers are at least partially flattened;
the breathable barrier fabric having a particle emission rate of less than 20,000 particles per minute for particles with a particle size of at least 0.3 μm and less than

12,000 particles per minute for particles with a particle size of at least 0.5 μm measured by the Helmke drum test method for a coverall according to IEST-RP-CC003.4.

2. The breathable barrier fabric of claim 1, wherein the breathable polymer in the film layer is selected from the group consisting of polyether block amide copolymer, polyester block amide copolymer, copolyester thermoplastic elastomer and thermoplastic urethane elastomer.

3. The breathable barrier fabric of claim 1, wherein the breathable polymer in the film layer comprises one or more copolyester thermoplastic elastomers.

4. The breathable barrier fabric of claim 2, wherein the breathable barrier fabric has a water-vapor transmission rate of 500 to 2,100 grams per square meter per day when tested according to ASTM E 96-00.

5. The breathable barrier fabric of claim 4, wherein the thermoplastic bicomponent fibers in the first outer spunbond nonwoven layer and the second outer spunbond nonwoven layer comprise a polyethylene sheath and a polyethylene terephthalate core.

6. The breathable barrier fabric of claim 5, wherein the polyethylene sheath comprises a high density polyethylene.

7. The breathable barrier fabric according to claim 1, wherein the outer glazed surface of the first outer spunbond layer and the second outer spunbond layer exhibits an average weight loss not greater than 3.5% calculated based on weight loss measured by the Taber shaving weight loss test method.

8. The breathable barrier fabric of claim 7, wherein the first outer spunbond layer has a weight in the range of about 10 to 70 grams per square meter, the film layer has a weight in the range of about 5 to 40 grams per square meter, and the second outer spunbond layer has a weight in the range of about 10 to 70 grams per square meter.

9. The breathable barrier fabric of claim 7, wherein the inner surface of the first outer spunbond layer and the second outer spunbond layer are each bonded to the film layer with an adhesive having a weight in the range of about 1 to 4 grams per square meter selected from the group consisting of hot melt adhesives, ultraviolet curable adhesives, thermoset adhesives, and aqueous based glues.

10. A cleanroom garment comprising the breathable barrier fabric of claim 1.

11. A method of fabricating a breathable barrier fabric, comprising the steps of:
forming a first outer spunbond layer comprising thermoplastic bicomponent fibers;
forming an inner monolithic film layer made from a breathable polymer;
forming a second outer spunbond layer comprising thermoplastic bicomponent fibers;
glazing an outer surface of each of the first outer spunbond layer and the second outer spunbond layer such that the thermoplastic bicomponent fibers are at least partially flattened; and
bonding an inner surface of the first outer spunbond layer and the second outer spunbond layer to a surface of the film layer to form the breathable barrier fabric having a particle emission rate of less than 20,000 particles per minute for particles with a particle size of at least 0.3 μm and less than 12,000 particles per minute for particles with a particle size of at least 0.5 μm measured by the Helmke drum test method for a coverall according to IEST-RP-CC003.4.

12. The method of claim 11, wherein the breathable polymer in the film layer is selected from the group consisting of polyether block amide copolymer, polyester block amide copolymer, copolyester thermoplastic elastomer and thermoplastic urethane elastomer.

13. The method of claim 11, wherein the breathable polymer in the film layer comprises one or more copolyester thermoplastic elastomers.

14. The method of claim 12, wherein the film layer is formed to have a water-vapor transmission rate of 500 to 2,100 grams per square meter per day when tested according to ASTM E 96-00.

15. The method of claim 14, wherein the thermoplastic bicomponent fibers in the first outer spunbond nonwoven layer and the second outer spunbond nonwoven layer comprise a polyethylene sheath and a polyethylene terephthalate core.

16. The method of claim 15, wherein the polyethylene sheath comprises a high density polyethylene.

17. The method of claim 15, wherein the glazing step comprises wrapping the first outer spunbond layer in a tensioned state around and in contact with a portion of a circumferential surface of a heated smooth roll which subtends a wrap angle to apply heat and pressure on the outer surface of a portion of the first outer spunbond layer while not applying any heat or pressure on the inner surface of the portion of the first outer spunbond layer, the outer surface of the first outer spunbond layer having an average weight loss not greater than 3.5% calculated based on weight loss measured by the Taber shaving weight loss test method.

18. The method of claim 17, wherein the glazing step further comprises wrapping the second outer spunbond layer in a tensioned state around and in contact with the portion of a circumferential surface of the heated smooth roll which subtends the wrap angle to apply heat and pressure on the outer surface of the portion of the second outer spunbond layer while not applying any heat or pressure on the inner surface of the portion of the second outer spunbond layer, the outer surface of the second outer spunbond layer having an average weight loss not greater than 3.5% calculated based on weight loss measured by a Taber shaving weight loss test method.

* * * * *